(12) United States Patent
Hunt et al.

(10) Patent No.: US 8,080,608 B2
(45) Date of Patent: Dec. 20, 2011

(54) OPTICAL FILMS COMPRISING PHENYL ETHYLENE (METH)ACRYLATE MONOMERS

(75) Inventors: Bryan V. Hunt, Fridley, MN (US); Kyle J. Lindstrom, Houlton, WI (US); James P. DiZio, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/936,552

(22) PCT Filed: May 19, 2009

(86) PCT No.: PCT/US2009/044461
§ 371 (c)(1),
(2), (4) Date: Oct. 6, 2010

(87) PCT Pub. No.: WO2009/148818
PCT Pub. Date: Dec. 10, 2009

(65) Prior Publication Data
US 2011/0086972 A1 Apr. 14, 2011

Related U.S. Application Data

(60) Provisional application No. 61/058,307, filed on Jun. 3, 2008.

(51) Int. Cl.
C08L 33/10 (2006.01)
C08L 33/08 (2006.01)
C08F 20/30 (2006.01)
C08F 20/10 (2006.01)

(52) U.S. Cl. ......... 524/556; 526/320; 526/326; 977/773

(58) Field of Classification Search .................. 524/556; 526/320, 326; 977/773
See application file for complete search history.

(56) References Cited

U.S. PATENT DOCUMENTS

| | | | |
|---|---|---|---|
| 4,576,850 A | 3/1986 | Martens | |
| 4,874,686 A * | 10/1989 | Urabe et al. | 430/272.1 |
| 5,175,030 A | 12/1992 | Lu et al. | |
| 5,183,597 A | 2/1993 | Lu | |
| 5,698,372 A * | 12/1997 | Okamoto et al. | 430/285.1 |
| 5,783,120 A | 7/1998 | Ouderkirk et al. | |
| 5,825,543 A | 10/1998 | Ouderkirk et al. | |
| 5,828,488 A | 10/1998 | Ouderkirk et al. | |
| 5,882,774 A | 3/1999 | Jonza et al. | |
| 6,111,696 A | 8/2000 | Allen et al. | |
| 6,191,184 B1 * | 2/2001 | Suzuki et al. | 522/79 |
| 6,368,682 B1 | 4/2002 | Fong | |
| 7,050,227 B2 * | 5/2006 | Olofson et al. | 359/443 |
| 7,074,463 B2 | 7/2006 | Jones et al. | |
| 7,241,437 B2 | 7/2007 | Davidson et al. | |
| 2005/0059766 A1* | 3/2005 | Jones et al. | 524/431 |
| 2005/0063898 A1 | 3/2005 | Ja Chisholm | |
| 2005/0148725 A1 | 7/2005 | Statz et al. | |
| 2006/0293463 A1* | 12/2006 | Olson et al. | 525/330.3 |
| 2007/0112097 A1 | 5/2007 | Olson et al. | |
| 2008/0221291 A1 | 9/2008 | Invie et al. | |
| 2008/0253148 A1 | 10/2008 | Jones et al. | |
| 2009/0017256 A1 | 1/2009 | Hunt et al. | |

FOREIGN PATENT DOCUMENTS

| | | |
|---|---|---|
| DE | 3812636 | 11/1988 |
| EP | 0333186 | 9/1989 |
| EP | 0695971 | 2/1996 |
| WO | WO 2008/121465 | 10/2008 |

OTHER PUBLICATIONS

International Search Report PCT/US2009/044461; Oct. 12, 2009, 5 pgs.

* cited by examiner

*Primary Examiner* — Michael M Bernshteyn
(74) *Attorney, Agent, or Firm* — Carolyn A. Fischer

(57) ABSTRACT

Presently described are (e.g. microstructured) optical films and polymerizable resin compositions comprising at least one (meth)acrylate monomer comprising an unsubstituted or substituted phenyl ethylene group referred to as phenyl ethylene (meth)acrylate monomers.

18 Claims, No Drawings

OPTICAL FILMS COMPRISING PHENYL ETHYLENE (METH)ACRYLATE MONOMERS

CROSS REFERENCE TO RELATED APPLICATIONS

This application is a national stage filing under 35 U.S.C. 371 of PCT/US2009/044461, filed May 19, 2009, which claims priority to U.S. Provisional Application No. 61/058,307, filed Jun. 3, 2008, the disclosure of which is incorporated by reference in its entirety herein.

Certain microstructured optical products, such as described in U.S. 2005/0148725, are commonly referred to as a "brightness enhancing films". Brightness enhancing films are utilized in many electronic products to increase the brightness of a backlit flat panel display such as a liquid crystal display (LCD) including those used in electroluminescent panels, laptop computer displays, word processors, desktop monitors, televisions, video cameras, as well as automotive and aviation displays.

Brightness enhancing films desirably exhibit specific optical and physical properties including the index of refraction of a brightness enhancing film that is related to the brightness gain (i.e. "gain") produced. Improved brightness can allow the electronic product to operate more efficiently by using less power to light the display, thereby reducing the power consumption, placing a lower heat load on its components, and extending the lifetime of the product.

Brightness enhancing films have been prepared from polymerizable resin compositions comprising high index of refraction monomers that are cured or polymerized. Halogenated (e.g. brominated) monomers or oligomers are often employed to attain refractive indices of for example 1.56 or greater. Another way to attain high refractive index compositions is to employ a polymerizable composition that comprises high refractive index nanoparticles.

One common monomer that has been employed as a reactive diluent in polymerizable resin compositions is phenoxyethyl acrylate, having a refractive index of 1.517 and a viscosity of 12 cps at 25° C.

DETAILED DESCRIPTION

Presently described are (e.g. microstructured) optical films and polymerizable resin compositions comprising at least one (meth)acrylate monomer comprising an unsubstituted or substituted phenyl ethylene group. Such monomers will be referred to herein as phenyl ethylene (meth)acrylate monomers.

The polymerized microstructure can be an optical element or optical product constructed of a base layer and a polymerized microstructured optical layer. The base layer and optical layer can be formed from the same or different polymeric material. One preferred optical film having a polymerized microstructured surface is a brightness enhancing film.

Brightness enhancing films generally enhance on-axis luminance (referred herein as "brightness") of a lighting device. Brightness enhancing films can be light transmissible, microstructured films. The microstructured topography can be a plurality of prisms on the film surface such that the films can be used to redirect light through reflection and refraction. The height of the prisms typically ranges from about 1 to about 75 microns. When used in an optical display such as that found in laptop computers, watches, etc., the microstructured optical film can increase brightness of an optical display by limiting light escaping from the display to within a pair of planes disposed at desired angles from a normal axis running through the optical display. As a result, light that would exit the display outside of the allowable range is reflected back into the display where a portion of it can be "recycled" and returned back to the microstructured film at an angle that allows it to escape from the display. The recycling is useful because it can reduce power consumption needed to provide a display with a desired level of brightness.

The brightness enhancing film of the invention generally comprises a (e.g. preformed polymeric film) base layer and an optical layer. The optical layer comprises a linear array of regular right prisms. Each prism has a first facet and a second facet. The prisms are formed on base that has a first surface on which the prisms are formed and a second surface that is substantially flat or planar and opposite first surface. By right prisms it is meant that the apex angle is typically about 90°. However, this angle can range from 70° to 120° and may range from 80° to 100°. These apexes can be sharp, rounded or flattened or truncated. For example, the ridges can be rounded to a radius in a range of 4 to 7 to 15 micrometers. The spacing between prism peaks (or pitch) can be 5 to 300 microns. For thin brightness enhancing films, the pitch is preferably 10 to 36 microns, and more preferably 18 to 24 microns. This corresponds to prism heights of preferably about 5 to 18 microns, and more preferably about 9 to 12 microns. The prism facets need not be identical, and the prisms may be tilted with respect to each other. The relationship between the total thickness of the optical article, and the height of the prisms, may vary. However, it is typically desirable to use relatively thinner optical layers with well-defined prism facets. For thin brightness enhancing films on substrates with thicknesses close to 1 mil (20-35 microns), a typical ratio of prism height to total thickness is generally between 0.2 and 0.4.

As described in Lu et al., U.S. Pat. No. 5,175,030, and Lu, U.S. Pat. No. 5,183,597, a microstructure-bearing article (e.g. brightness enhancing film) can be prepared by a method including the steps of (a) preparing a polymerizable composition; (b) depositing the polymerizable composition onto a master negative microstructured molding surface in an amount barely sufficient to fill the cavities of the master; (c) filling the cavities by moving a bead of the polymerizable composition between a preformed base (such as a PET film) and the master, at least one of which is flexible; and (d) curing the composition. The master can be metallic, such as nickel, nickel-plated copper or brass, or can be a thermoplastic material that is stable under the polymerization conditions, and that preferably has a surface energy that allows clean removal of the polymerized material from the master. One or more the surfaces of the base film can optionally be primed or otherwise be treated to promote adhesion of the optical layer to the base.

In some embodiments, the polymerizable resin composition comprises surface modified inorganic nanoparticles. In such embodiments, "polymerizable composition" refers to the total composition, i.e. the organic component and surface modified inorganic nanoparticles. The "organic component" refers to all of the components of the composition except for the surface modified inorganic nanoparticles. Since the surface treatments are generally adsorbed or otherwise attached to the surface of the inorganic nanoparticles, the surface treatments are not considered a portion of the bulk organic component. When the composition is free of inorganic materials such as surface modified inorganic nanoparticles the polymerizable resin composition and organic component are one in the same.

The organic component as well as the polymerizable composition is preferably substantially solvent free. "Substantially solvent free" refer to the polymerizable composition having less than 5 wt-%, 4 wt-%, 3 wt-%, 2 wt-%, 1 wt-% and 0.5 wt-% of non-polymerizable (e.g. organic) solvent. The concentration of solvent can be determined by known methods, such as gas chromatography (as described in ASTM D5403). Solvent concentrations of less than 0.5 wt-% are preferred.

The components of the organic component are preferably chosen such that the polymerizable resin composition has a low viscosity. In some embodiments, the viscosity of the organic component is less than 1000 cps and typically less than 900 cps at the coating temperature. The viscosity of the organic component may be less than 800 cps, less than 700 cps, less than 600 cps, or less than 500 cps at the coating temperature. As used herein, viscosity is measured (at a shear rate up to 1000 sec-1) with 25 mm parallel plates using a Dynamic Stress Rheometer. Further, the viscosity of the organic component is typically at least 10 cps, more typically at least 50 cps at the coating temperature.

The coating temperature typically ranges from ambient temperature, 77° F. (25° C.) to 180° F. (82° C.). The coating temperature may be less than 170° F. (77° C.), less than 160° F. (71° C.), less than 150° F. (66° C.), less than 140° F. (60° C.), less than 130° F. (54° C.), or less than 120° F. (49° C.). The phenyl ethylene (meth)acrylate monomer and the organic components can be a solid or comprise a solid component provided that the melting point in the polymerizable composition is less than the coating temperature. The organic component as well as the phenyl ethylene (meth)acrylate monomer described herein is preferably a liquid at ambient temperature.

In some embodiments, the phenyl ethylene (meth)acrylate monomer has a viscosity of less than 80 cps, 70 cps, or 60 cps. Some preferred species of phenyl ethylene (meth)acrylate monomer have a viscosity of less than 10 cps at 25° C.

The phenyl ethylene (meth)acrylate monomer, as well as the organic component has a refractive index of at least 1.52. Preferably the phenyl ethylene (meth)acrylate monomer has a refractive index of at least 1.54, 1.55, 1.56, 1.57, 1.58, 1.59, or 1.60. The polymerizable composition including high refractive index nanoparticles can have a refractive index as high as 1.70. (e.g. at least 1.61, 1.62, 1.63, 1.64, 1.65, 1.66, 1.67, 1.68, or 1.69). High transmittance in the visible light spectrum is also typically preferred.

The polymerizable composition is energy curable in time scales preferably less than five minutes (e.g. for a brightness enhancing film having a 75 micron thickness). The polymerizable composition is preferably sufficiently crosslinked to provide a glass transition temperature that is typically greater than 45° C. The glass transition temperature can be measured by methods known in the art, such as Differential Scanning calorimetry (DSC), modulated DSC, or Dynamic Mechanical Analysis. The polymerizable composition can be polymerized by conventional free radical polymerization methods.

The presently described optical films are prepared from a polymerizable resin composition comprising at least one (meth)acrylate monomer comprising a unsubstituted or substituted phenyl ethylene group. The (meth)acrylate substituent is preferably an acrylate substituent.

The phenyl ethylene group of the (meth)acrylate monomer has the following structure:

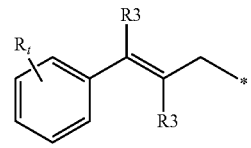

wherein
R is an optional substituent;
t ranges from 0 to 5; and
R3 is H or a substituent.

In some embodiments, the aromatic ring of the phenyl ethylene group is unsubstituted, i.e. t is 0.

In other embodiments, R is independently selected from a C2-C12 alkyl group, halogen, alkyaryl, an ether group, and a nitro group. Typically t is 1 or 2.

In some embodiments, both R3 groups are H. In other embodiments, at least one R3 group comprises a substituent. The substituent is typically selected from a C2-C12 alkyl group, halogen, alkyaryl, and an ether group.

In some embodiments, t is 0 and both R3 groups are hydrogen.

In some embodiments, the phenyl ethylene (meth)acrylate monomer has the structure

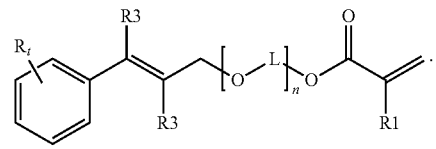

wherein R is an optional substituent as previously described;
R3 is H or a substituent as previously described;
L is a C2-C12 alkyl group optionally substituted with one or more hydroxyl groups;
n ranges from 0 to 10; and
R1 is H or CH$_3$.

In other embodiments, the phenyl ethylene (meth)acrylate monomer has the structure

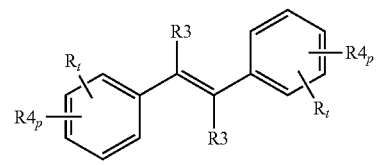

wherein R is an optional substituent as previously described;
R3 is H or a substituent as previously described;
R4 is a substituent comprising a (meth)acrylate group, p independently ranges from 0 to 2 provided at least one p is 1.

Suitable R4 substituents that comprise a (meth)acrylate include for example

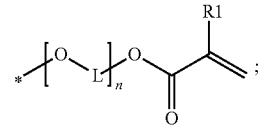

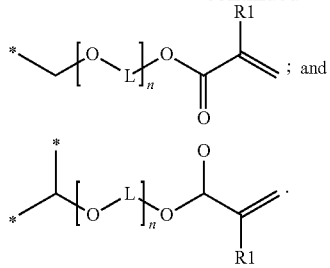
; and wherein
L is a C2-C12 alkyl group optionally substituted with one or more hydroxyl groups;
n ranges from 0 to 10; and
R1 is H or $CH_3$.

Regardless of the structure, in some embodiments, n is preferably at least 1. Further, L is preferably a C2-C3 alkyl group optionally substituted with one or more hydroxyl groups.

Suitable phenyl ethylene (meth)acrylate monomers include for example

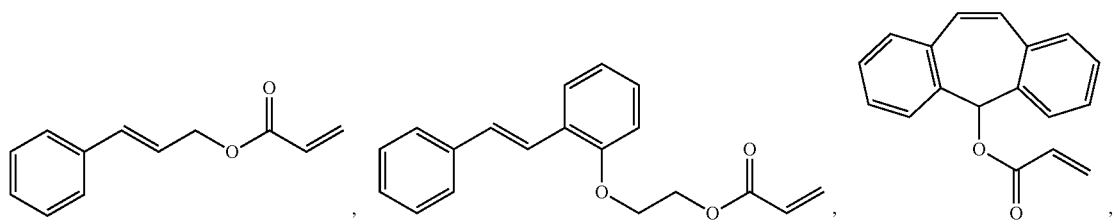

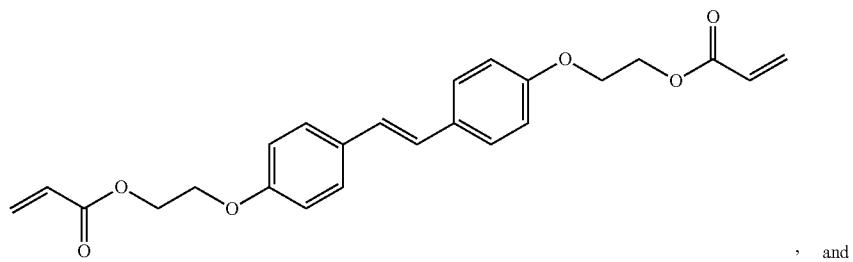

, and

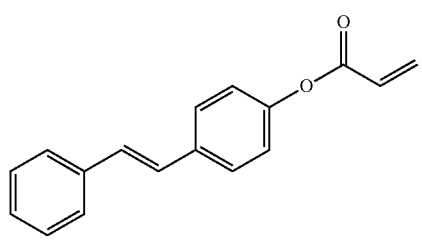

.

The phenyl ethylene (meth)acrylate monomers described herein can be prepared by synthetic methods as known by one of ordinary skill in the art. For example, cinnamyl alcohol or stilbene alcohol can be reacted with acryloyl chloride. Exemplary syntheses are described in the forthcoming examples. Suitable phenyl ethylene groups derived from starting alcohol monomers are set forth in Tables 1 and 2 as follows:

TABLE 1

TABLE 1-continued

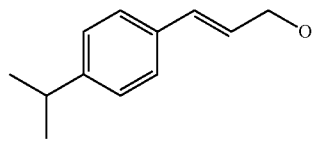

TABLE 1-continued
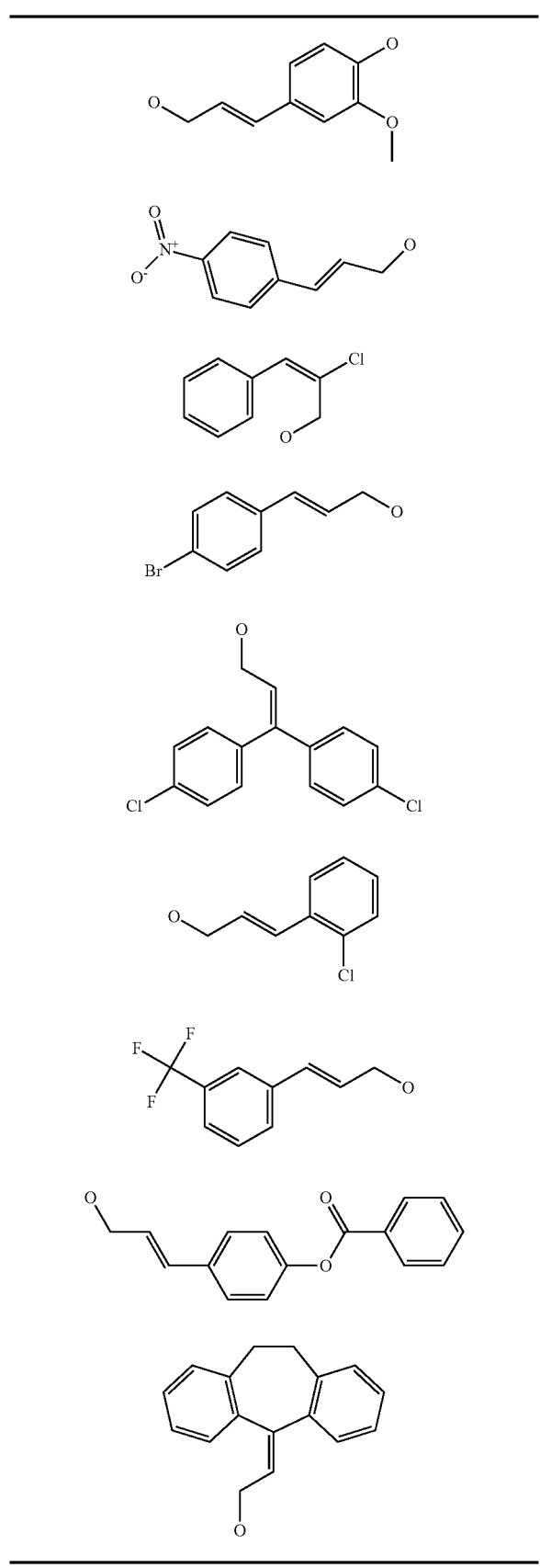
TABLE 2
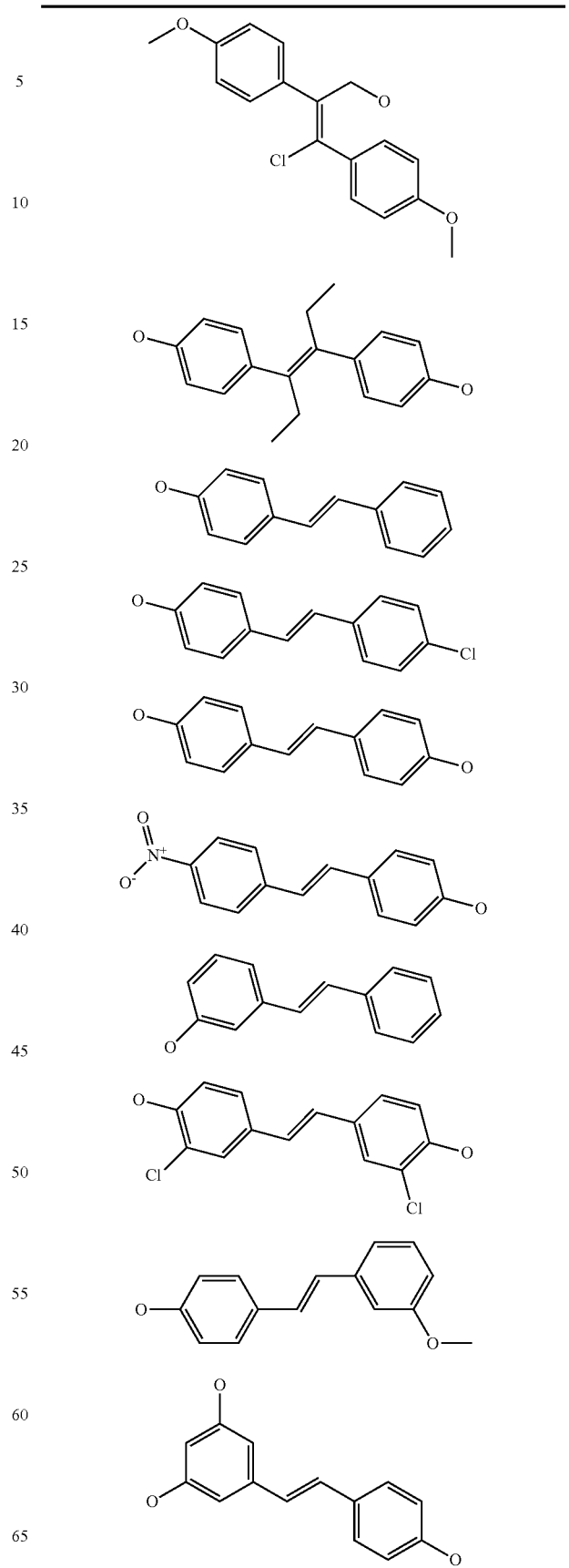

TABLE 2-continued

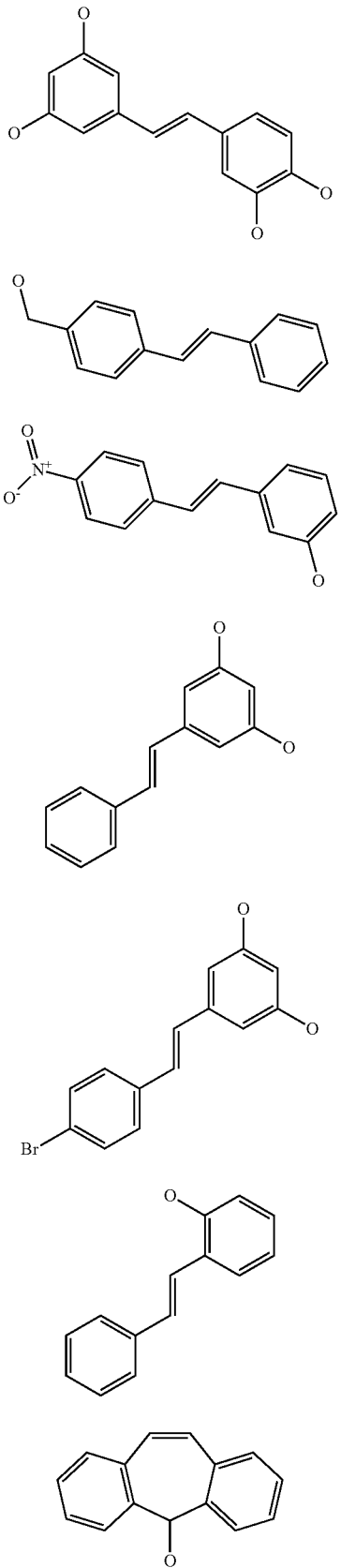

TABLE 2-continued

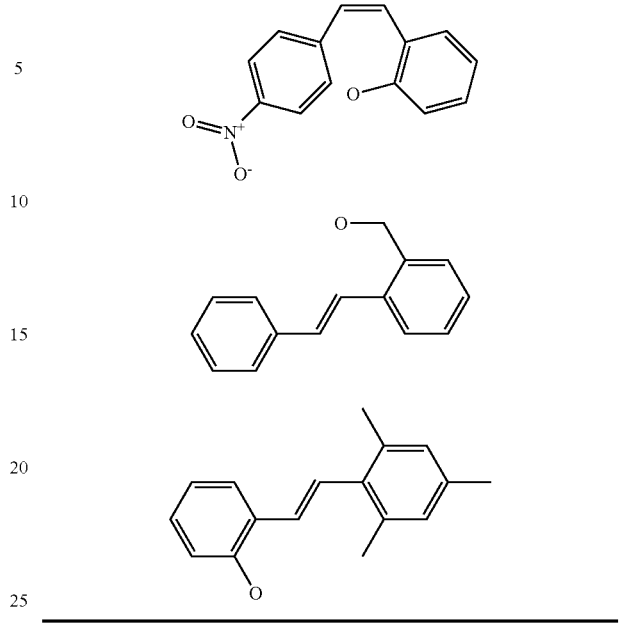

The starting materials are commercially available from various suppliers including Aldrich, TCI, and VWR.

In some embodiments, the phenyl ethylene monomer the phenyl ethylene monomer is a multi-(meth)acrylate monomer. The phenyl ethylene monomer is preferably a monofunctional (meth)acrylate monomer. Such monofunctional phenyl ethylene monomer is preferably employed in combination with other multi- and in particular di-(meth)acrylate monomers.

The amount of phenyl ethylene (meth)acrylate employed in the polymerizable resin composition can vary. A small concentration, for example 1 wt-%, 2 wt-%, 3 wt-%, 4 wt-%, or 5 wt-% may be substituted for a portion of a lower refractive index component(s) in order to raise the refractive index of the polymerizable resin composition. However, typically the polymerizable resin composition comprises 15 wt-% to 75 wt-% of one or more phenyl ethylene (meth)acrylate monomers in combination with 25 wt-% to 75 wt-% of one or more aromatic monomers or oligomers having at least two polymerizable (meth)acrylate groups.

A variety of aromatic monomers and/or oligomers having at least two polymerizable (meth)acrylate groups may be employed. Such aromatic monomer typically comprises at least two aromatic rings and a molecular weight of at least 350 g/mole, 400 g/mole, or 450 g/mole.

The aromatic monomer or oligomer having at least two polymerizable (meth)acrylate groups may be synthesized or purchased. The aromatic monomer or oligomer typically contains a major portion, i.e. at least 60-70 wt-%, of a specific structure. It is commonly appreciated that other reaction products are also typically present as a byproduct of the synthesis of such monomers.

In some embodiments, the polymerizable composition comprises at least one phenyl ethylene (meth)acrylate and at least one aromatic (optionally brominated) difunctional (meth)acrylate monomer that comprises a major portion having the following general structure:

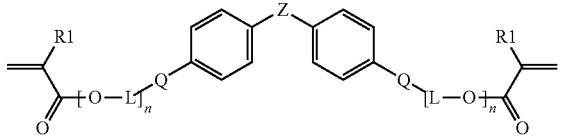 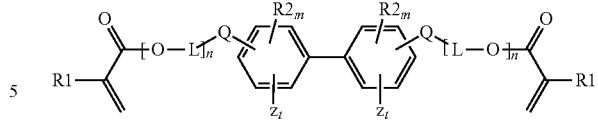

wherein Z is independently —C(CH₃)₂—, —CH₂—, —C(O)—, —S—, —S(O)—, or —S(O)₂—, each Q is independently O or S. L is a linking group. L may independently comprise a branched or linear $C_2$-$C_{12}$ alkyl group and n ranges from 0 to 10. L preferably comprises a branched or linear $C_2$-$C_6$ alkyl group. More preferably L is $C_2$ or $C_3$ and n is 0, 1, 2 or 3. The carbon chain of the alkyl linking group may optionally be substituted with one or more hydroxy groups. For example L may be —CH₂CH(OH)CH₂—. Typically, the linking groups are the same. R1 is independently hydrogen or methyl.

In some embodiments, the aromatic monomer is a bisphenol di(meth)acrylate, i.e. the reaction product of a bisphenol A diglycidyl ether and acrylic acid. Although bisphenol A diglycidyl ether is generally more widely available, it is appreciated that other biphenol diglycidyl ether such as bisphenol F diglycidyl ether could also be employed. For example, the di(meth)acrylate monomer can be the reaction product of Tetrabromobisphenol A diglycidyl ether and acrylic acid. Such monomer may be obtained from UCB Corporation, Smyrna, Ga. under the trade designation "RDX-51027". This material comprises a major portion of 2-propenoic acid, (1-methylethylidene)bis[(2,6-dibromo-4,1-phenylene)oxy(2-hydroxy-3,1-propanediyl)] ester.

One exemplary bisphenol-A ethoxylated diacrylate monomer is commercially available from Sartomer under the trade designations "SR602" (reported to have a viscosity of 610 cps at 20° C. and a Tg of 2° C.). Another exemplary bisphenol-A ethoxylated diacrylate monomer is as commercially available from Sartomer under the trade designation "SR601" (reported to have a viscosity of 1080 cps at 20° C. and a Tg of 60° C.).

Alternatively or in addition to, the organic component may comprise one or more (meth)acrylated aromatic epoxy oligomers. Various (meth)acrylated aromatic epoxy oligomers are commercially available. For example, (meth)acrylated aromatic epoxy, (described as a modified epoxy acrylates), are available from Sartomer, Exton, Pa. under the trade designation "CN118", and "CN115". (Meth)acrylated aromatic epoxy oligomer, (described as an epoxy acrylate oligomer), is available from Sartomer under the trade designation "CN2204". Further, a (meth)acrylated aromatic epoxy oligomer, (described as an epoxy novolak acrylate blended with 40% trimethylolpropane triacrylate), is available from Sartomer under the trade designation "CN 112C60". One exemplary aromatic epoxy acrylate is commercially available from Sartomer under the trade designation "CN120" (reported by the supplier to have a refractive index of 1.5556, a viscosity of 2150 at 65° C., and a Tg of 60° C.).

In some embodiments, the polymerizable resin composition comprises at least one phenyl ethylene (meth)acrylate (meth)acrylate and at least one difunctional biphenyl (meth) acrylate monomer that comprises a major portion having the following general structure:

wherein each R1 is independently H or methyl;
each R2 is independently Br;
m ranges from 0 to 4;
each Q is independently O or S;
n ranges from 0 to 10;
L is a C2 to C12 alkyl group optionally substituted with one or more hydroxyl groups;
z is an aromatic ring; and
t is independently 0 or 1.

In some aspects, Q is preferably O. Further, n is typically 0, 1 or 2. L is typically $C_2$ or $C_3$. Alternatively, L is typically a hydroxyl substituted $C_2$ or $C_3$. In some embodiments, z is preferably fused to the phenyl group thereby forming a binapthyl core structure.

Preferably, at least one of the -Q[L-O]n C(O)C(R1)=CH₂ groups is substituted at the ortho or meta position. More preferably, the biphenyl di(meth)acrylate monomer comprises a sufficient amount of ortho and/or meta (meth)acrylate substituents such that the monomer is a liquid at 25° C. In some embodiments, each (meth)acrylate group containing substituent is bonded to an aromatic ring group at an ortho or meta position. It is preferred that the biphenyl di(meth)acrylate monomer comprises a major amount of ortho (meth)acrylate substituents (i.e. at least 50%, 60%, 70%, 80%, 90%, or 95% of the substituents of the biphenyl di(meth)acrylate monomer). In some embodiments, each (meth)acrylate group containing substituent is bonded to an aromatic ring group at an ortho or meta position. As the number of meta- and particularly para-substituents increases, the viscosity of the organic components can increase as well. Further, para-biphenyl di(meth)acrylate monomers are solids at room temperature, with little solubility (i.e. less than 10%), even in phenoxyethyl acrylate and tetrahydrofurfuryl acrylate.

Such biphenyl monomers are described in further detail in Published U.S. Application No. 2008/0221291. Other biphenyl di(meth)acrylate monomer are described in the literature.

The polymerizable resin composition may optionally comprise one or more monofunctional diluents in amounts up to about 50 wt-%. In some embodiments, the polymerizable resin composition comprises at least 5 wt-%, 10 wt-% or 15 wt-% of such monofunctional diluents to improve the processability of the resin composition by reducing its viscosity.

Aromatic (e.g. monofunctional) (meth)acrylate monomers typically comprise a phenyl, cumyl, biphenyl, or napthyl group. Preferred diluents can have a refractive index greater than 1.50, 1.51, 1.52, 1.53, 1.54, or 1.55. Such reactive diluents can be halogenated, non-brominated, or non-halogenated.

Suitable monomers include phenoxyethyl(meth)acrylate; phenoxy-2-methylethyl (meth)acrylate; phenoxyethoxyethyl (meth)acrylate, 3-hydroxy-2-hydroxypropyl (meth)acrylate; benzyl(meth)acrylate; phenylthio ethyl acrylate; 2-naphthylthio ethyl acrylate; 1-naphthylthio ethyl acrylate; naphthyloxy ethyl acrylate; 2-naphthyloxy ethyl acrylate; phenoxy 2-methylethyl acrylate; phenoxyethoxyethyl acrylate; 3-phenoxy-2-hydroxy propyl acrylate; and phenyl acrylate.

Phenoxyethyl acrylate is commercially available from more than one source including from Sartomer under the trade designation "SR339"; from Eternal Chemical Co. Ltd.

under the trade designation "Etermer 210"; and from Toagosei Co. Ltd under the trade designation "TO-1166". Phenylthio ethyl acrylate (PTEA) is also commerically available from Cognis. The structure of these monomers is shown as follows:

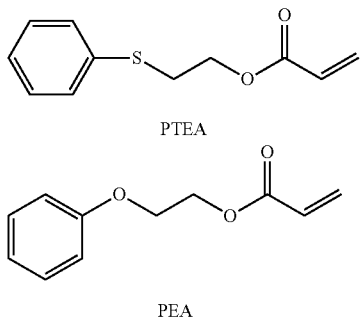

PTEA

PEA

In some embodiments, the polymerizable compositions comprise one or more monofunctional biphenyl monomer(s).

Monofunctional biphenyl monomers comprise a terminal biphenyl group (wherein the two phenyl groups are not fused, but joined by a bond) or a terminal group comprising two aromatic groups joined by a linking group (e.g. Q). For example, when the linking group is methane, the terminal group is a biphenylmethane group. Alternatively, wherein the linking group is —(C(CH$_3$)$_2$—, the terminal group is 4-cumyl phenyl. The monofunctional biphenyl monomer(s) also comprise a single ethylenically unsaturated group that is preferably polymerizable by exposure to (e.g. UV) radiation. The monofunctional biphenyl monomer(s) preferably comprise a single (meth)acrylate group or single thio(meth)acrylate group. Acrylate functionality is typically preferred. In some aspects, the biphenyl group is joined directly to the ethylenically unsaturated (e.g. (meth)acrylate) group. An exemplary monomer of this type is 2-phenyl-phenyl acrylate. The biphenyl mono(meth)acrylate or biphenyl thio(meth)acrylate monomer may further comprise a (e.g. 1 to 5 carbon) alkyl group optionally substituted with one or more hydroxyl groups. An exemplary species of this type is 2-phenyl-2-phenoxyethyl acrylate.

In one embodiment, a monofunctional biphenyl(meth) acrylate monomer is employed having the general structure:

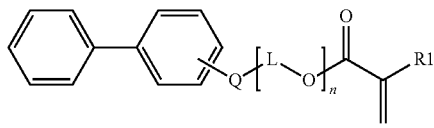

wherein
R1 is H or CH$_3$;
Q is O or S;
n ranges from 0 to 10 (e.g. n is 1, 2, 3, 4, 5, 6, 7, 8, 9, or 10); and
L is preferably an alkyl group having 1 to 5 carbon atoms (i.e. methyl, ethyl, propyl, butyl, or pentyl), optionally substituted with hydroxy.

In another embodiment, the monofunctional biphenyl (meth)acrylate monomer has the general structure:

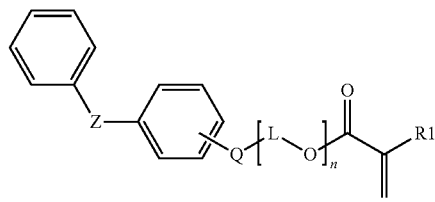

wherein
R1 is H or CH$_3$;
Q is O or S;
Z is selected from —(C(CH$_3$)$_2$—, —CH$_2$, —C(O)—, —S(O)—, and —S(O)$_2$—;
n ranges from 0 to 10 (e.g. n is 1, 2, 3, 4, 5, 6, 7, 8, 9, or 10); and
L is an alkyl group having 1 to 5 carbon atoms (i.e. methyl, ethyl, butyl, or pentyl), optionally substituted with hydroxy.

Some specific monomers that are commercially available from Toagosei Co. Ltd. of Japan, include for example 2-phenyl-phenyl acrylate available under the trade designation "TO-2344", 4-(-2-phenyl-2-propyl)phenyl acrylate available under the trade designation "TO-2345", and 2-phenyl-2-phenoxyethyl acrylate, available under the trade designation "TO-1463".

Various combinations of aromatic monofunctional (meth) acrylate monomers can be employed. For example, a (meth) acrylate monomer comprising a phenyl group may be employed in combination with one or more (meth)acrylate monomers comprising a biphenyl group. Further, two different biphenyl(meth)acrylate monofunctional monomers may be employed.

The polymerizable resin may optionally comprise up to 35 wt-% of various other (e.g. non-halogenated) ethylenically unsaturated monomers. For example, when the (e.g. prism) structures are cast and photocured upon a polycarbonate preformed polymeric film the polymerizable resin composition may comprise one or more N,N-disubstituted (meth)acrylamide monomers. These include N-alkylacrylamides and N,N-dialkylacrylamides, especially those containing C$_{1-4}$ alkyl groups. Examples are N-isopropylacrylamide, N-t-butylacrylamide, N,N-dimethylacrylamide, N,N-diethylacrylamide, N-vinyl pyrrolidone and N-vinyl caprolactam.

The polymerizable resin composition may also optionally comprise up to 20 wt-% of a non-aromatic crosslinker that comprises at least three (meth)acrylate groups. Suitable crosslinking agents include for example pentaerythritol tri (meth)acrylate, pentaerythritol tetra(meth)acrylate, trimethylolpropane tri(methacrylate), dipentaerythritol penta(meth) acrylate, dipentaerythritol hexa(meth)acrylate, trimethylolpropane ethoxylate tri(meth)acrylate, glyceryl tri (meth)acrylate, pentaerythritol propoxylate tri(meth)acrylate, and ditrimethylolpropane tetra(meth)acrylate. Any one or combination of crosslinking agents may be employed. Since methacrylate groups tend to be less reactive than acrylate groups, the crosslinker(s) are preferably free of methacrylate functionality.

Various crosslinkers are commercially available. For example, pentaerythritol triacrylate (PETA) is commercially available from Sartomer Company, Exton, Pa. under the trade designation "SR444"; from Osaka Organic Chemical Industry, Ltd. Osaka, Japan under the trade designation "Viscoat #300"; from Toagosei Co. Ltd., Tokyo, Japan under the trade designation "Aronix M-305"; and from Eternal Chemical Co., Ltd., Kaohsiung, Taiwan under the trade designation "Etermer 235". Trimethylol propane triacrylate (TMPTA) is commercially available from Sartomer Company under the trade designations "SR351". TMPTA is also available from Toagosei Co. Ltd. under the trade designation "Aronix M-309". Further, ethoxylated trimethylolpropane triacrylate and ethoxylated pentaerythritol triacrylate are commercially available from Sartomer under the trade designations "SR454" and "SR494" respectively.

In some embodiments, it is preferred that the polymerized microstructured surface of the optical film, the polymerizable resin composition, and the phenyl ethylene (meth)acrylate monomer are substantially free (i.e. contain less than 1 wt-%) of bromine. In other embodiments, the total amount of bromine in combination with chlorine is less than 1 wt-%. In some aspects, the polymerized microstructured surface or the optical film, the polymerizable resin composition, and the phenyl ethylene (meth)acrylate monomer are substantially non-halogenated (i.e. contains less than 1 wt-% total of bromine, chlorine, fluorine and iodine).

The UV curable polymerizable compositions comprise at least one photoinitiator. A single photoinitiator or blends thereof may be employed in the brightness enhancement film of the invention. In general the photoinitiator(s) are at least partially soluble (e.g. at the processing temperature of the resin) and substantially colorless after being polymerized. The photoinitiator may be (e.g. yellow) colored, provided that the photoinitiator is rendered substantially colorless after exposure to the UV light source.

Suitable photoinitiators include monoacylphosphine oxide and bisacylphosphine oxide. Commercially available mono or bisacylphosphine oxide photoinitiators include 2,4,6-trimethylbenzoybiphenylphosphine oxide, commercially available from BASF (Charlotte, N.C.) under the trade designation "Lucirin TPO"; ethyl-2,4,6-trimethylbenzoylphenyl phosphinate, also commercially available from BASF under the trade designation "Lucirin TPO-L"; and bis(2,4,6-trimethylbenzoyl)-phenylphosphine oxide commercially available from Ciba Specialty Chemicals under the trade designation "Irgacure 819". Other suitable photoinitiators include 2-hydroxy-2-methyl-1-phenyl-propan-1-one, commercially available from Ciba Specialty Chemicals under the trade designation "Darocur 1173" as well as other photoinitiators commercially available from Ciba Specialty Chemicals under the trade designations "Darocur 4265", "Irgacure 651", "Irgacure 1800", "Irgacure 369", "Irgacure 1700", and "Irgacure 907".

The photoinitiator can be used at a concentration of about 0.1 to about 10 weight percent. More preferably, the photoinitiator is used at a concentration of about 0.5 to about 5 wt-%. Greater than 5 wt-% is generally disadvantageous in view of the tendency to cause yellow discoloration of the brightness enhancing film. Other photoinitiators and photoinitiator may also suitably be employed as may be determined by one of ordinary skill in the art.

Surfactants such as fluorosurfactants and silicone based surfactants can optionally be included in the polymerizable composition to reduce surface tension, improve wetting, allow smoother coating and fewer defects of the coating, etc.

The phenyl ethylene (meth)acrylate monomers described herein are particularly useful in preparing non-halogenated high refractive index polymerizable organic compositions. In some aspects the compositions are free of inorganic nanoparticles.

In other embodiments, the polymerizable composition further comprises inorganic nanoparticles.

Surface modified (e.g. colloidal) nanoparticles can be present in the polymerized structure in an amount effective to enhance the durability and/or refractive index of the article or optical element. In some embodiments, the total amount of surface modified inorganic nanoparticles can be present in the polymerizable resin or optical article in an amount of at least 10 wt-%, 20 wt-%, 30 wt-% or 40 wt-%. The concentration is typically less than to 70 wt-%, and more typically less than 60 wt-% in order that the polymerizable resin composition has a suitable viscosity for use in cast and cure processes of making microstructured films.

The size of such particles is chosen to avoid significant visible light scattering. It may be desirable to employ a mixture of inorganic oxide particle types to optimize an optical or material property and to lower total composition cost. The surface modified colloidal nanoparticles can be oxide particles having a (e.g. unassociated) primary particle size or associated particle size of greater than 1 nm, 5 nm or 10 nm. The primary or associated particle size is generally and less than 100 nm, 75 nm, or 50 nm. Typically the primary or associated particle size is less than 40 nm, 30 nm, or 20 nm. It is preferred that the nanoparticles are unassociated. Their measurements can be based on transmission electron microscopy (TEM). The nanoparticles can include metal oxides such as, for example, alumina, zirconia, titania, mixtures thereof, or mixed oxides thereof. Surface modified colloidal nanoparticles can be substantially fully condensed.

Fully condensed nanoparticles (with the exception of silica) typically have a degree of crystallinity (measured as isolated metal oxide particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g. zirconia) nanoparticles have a high refractive index whereas amorphous nanoparticles typically have a lower refractive index.

Zirconia and titania nanoparticles can have a particle size from 5 to 50 nm, or 5 to 15 nm, or 8 nm to 12 nm. Zirconia nanoparticles can be present in the durable article or optical element in an amount from 10 to 70 wt-%, or 30 to 60 wt-%. Zirconias for use in composition and articles of the invention are available from Nalco Chemical Co. under the trade designation "Nalco OOSSOO8" and from Buhler AG Uzwil, Switzerland under the trade designation "Buhler zirconia Z—WO sol".

The zirconia particles can be prepared using hydrothermal technology as described in U.S. Pat. No. 7,241,437. The nanoparticles are surface modified. Surface modification involves attaching surface modification agents to inorganic oxide (e.g. zirconia) particles to modify the surface characteristics. The overall objective of the surface modification of the inorganic particles is to provide resins with homogeneous components and preferably a low viscosity that can be prepared into films (e.g. using cast and cure processes) with high brightness.

The nanoparticles are often surface-modified to improve compatibility with the organic matrix material. The surface-modified nanoparticles are often non-associated, non-agglomerated, or a combination thereof in an organic matrix material. The resulting light management films that contain these surface-modified nanoparticles tend to have high optical clarity and low haze. The addition of the high refractive index surface-modified nanoparticles, such as zirconia, can increase the gain of brightness enhancement film compared to films that contain only polymerized organic material.

The monocarboxylic acid surface treatments preferably comprise a compatibilizing group. The monocarboxylic acids may be represented by the formula A-B where the A group is a (e.g. monocarboxylic acid) group capable of attaching to the surface of a (e.g. zirconia or titania) nanoparticle, and B is a compatibilizing group that comprises a variety of different functionalities. The carboxylic acid group can be attached to the surface by adsorption and/or formation of an ionic bond. The compatibilizing group B is generally chosen such that it is compatible with the polymerizable resin of the (e.g. brightness enhancing) optical article. The compatibilizing group B can be reactive or nonreactive and can be polar or non-polar.

Compatibilizing groups B that can impart non-polar character to the zirconia particles include, for example, linear or branched aromatic or aliphatic hydrocarbons. Representative examples of non-polar modifying agents having carboxylic acid functionality include octanoic acid, dodecanoic acid, stearic acid, oleic acid, and combinations thereof.

The compatibilizing group B may optionally be reactive such that it can copolymerize with the organic matrix of the (e.g. brightness enhancing) optical article. For instance, free radically polymerizable groups such as (meth)acrylate compatibilizing groups can copolymerize with (meth)acrylate functional organic monomers to generate brightness enhancement articles with good homogeneity.

Suitable surface modifications are described in U.S. Publication No. 2007/0112097 and WO2008/121465.

The surface modified particles can be incorporated into the curable (i.e. polymerizable) resin compositions in various methods. In a preferred aspect, a solvent exchange procedure is utilized whereby the resin is added to the surface modified sol, followed by removal of the water and co-solvent (if used) via evaporation, thus leaving the particles dispersed in the polymerizable resin. The evaporation step can be accomplished for example, via distillation, rotary evaporation or oven drying. In another aspect, the surface modified particles can be extracted into a water immiscible solvent followed by solvent exchange, if so desired. Alternatively, another method for incorporating the surface modified nanoparticles in the polymerizable resin involves the drying of the modified particles into a powder, followed by the addition of the resin material into which the particles are dispersed. The drying step in this method can be accomplished by conventional means suitable for the system, such as, for example, oven drying or spray drying.

The optical layer can directly contact the base layer or be optically aligned to the base layer, and can be of a size, shape and thickness allowing the optical layer to direct or concentrate the flow of light. The optical layer can have a structured or micro-structured surface that can have any of a number of useful patterns such as described and shown in the U.S. Pat. No. 7,074,463. The micro-structured surface can be a plurality of parallel longitudinal ridges extending along a length or width of the film. These ridges can be formed from a plurality of prism apexes. These apexes can be sharp, rounded or flattened or truncated. For example, the ridges can be rounded to a radius in a range of 4 to 7 to 15 micrometers.

These include regular or irregular prismatic patterns, which can be an annular prismatic pattern, a cube-corner pattern or any other lenticular microstructure. A useful microstructure is a regular prismatic pattern that can act as a totally internal reflecting film for use as a brightness enhancement film. Another useful microstructure is a corner-cube prismatic pattern that can act as a retro-reflecting film or element for use as reflecting film. Another useful microstructure is a prismatic pattern that can act as an optical element for use in an optical display. Another useful microstructure is a prismatic pattern that can act as an optical turning film or element for use in an optical display.

The base layer can be of a nature and composition suitable for use in an optical product, i.e. a product designed to control the flow of light. Almost any material can be used as a base material as long as the material is sufficiently optically clear and is structurally strong enough to be assembled into or used within a particular optical product. A base material can be chosen that has sufficient resistance to temperature and aging that performance of the optical product is not compromised over time.

Useful base materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polycyclo-olefins, polyimides, and glass. Optionally, the base material can contain mixtures or combinations of these materials. In an embodiment, the base may be multi-layered or may contain a dispersed component suspended or dispersed in a continuous phase.

For some optical products such as microstructure-bearing products such as, for example, brightness enhancement films, examples of preferred base materials include polyethylene terephthalate (PET) and polycarbonate. Examples of useful PET films include photograde polyethylene terephthalate and MELINEX™ PET available from DuPont Films of Wilmington, Del.

Some base materials can be optically active, and can act as polarizing materials. A number of bases, also referred to herein as films or substrates, are known in the optical product art to be useful as polarizing materials. Polarization of light through a film can be accomplished, for example, by the inclusion of dichroic polarizers in a film material that selectively absorbs passing light. Light polarization can also be achieved by including inorganic materials such as aligned mica chips or by a discontinuous phase dispersed within a continuous film, such as droplets of light modulating liquid crystals dispersed within a continuous film. As an alternative, a film can be prepared from microfine layers of different materials. The polarizing materials within the film can be aligned into a polarizing orientation, for example, by employing methods such as stretching the film, applying electric or magnetic fields, and coating techniques.

Examples of polarizing films include those described in U.S. Pat. Nos. 5,825,543 and 5,783,120. The use of these polarizer films in combination with a brightness enhancement film has been described in U.S. Pat. No. 6,111,696.

A second example of a polarizing film that can be used as a base are those films described in U.S. Pat. No. 5,882,774. Films available commercially are the multilayer films sold under the trade designation DBEF (Dual Brightness Enhancement Film) from 3M. The use of such multilayer polarizing optical film in a brightness enhancement film has been described in U.S. Pat. No. 5,828,488.

A common way of measuring the effectiveness of such recycling of light is to measure the gain of an optical film. As used herein, "relative gain", is defined as the on-axis luminance, as measured by the test method described in the examples, when an optical film (or optical film assembly) is placed on top of the light box, relative to the on-axis luminance measured when no optical film is present on top of the light box. This definition can be summarized by the following relationship:

Relative Gain=(Luminance measured with optical film)/(Luminance measured without optical film)

In one embodiment, an optical film comprising a light transmissive (e.g. cured) polymeric material having a microstructured surface is described. The optical film is a substantially non-polarizing film having a single sheet relative gain of at least 1.60. The relative single sheet gain is typically no greater than 2.05. Accordingly, the single sheet relative gain may also range from any values in the set of relative gain values including 1.65, 1.70, 1.75, 1.80, 1.85, and 1.90 or greater.

In other embodiments, the inventions relate to various assemblies that comprise or consist of two or more films. Each assembly includes a first microstructured optical film proximate a second (e.g. microstructured or unstructured) optical film.

By proximate, it is meant sufficiently near. Proximate can include the first microstructured optical film being in contact with the second optical film such as by the films merely being stacked together or the films may be attached by various means. The films may be attached by mechanical means, chemical means, thermal means, or a combination thereof. Chemical means includes various pressure sensitive, solvent-based, and hot melt adhesives as well as two-part curable adhesive compositions that crosslink upon exposure to heat, moisture, or radiation. Thermal means includes for example a heated embossed roller, radio frequency (RF) welding, and ultrasonic welding. The optical films may be attached (e.g. continuously) across the entire plane of the films, at only select points, or at only the edges. Alternatively, the proximate optical films may be separated from each other with an air interface. The air interface may be created by increasing the thickness of either or both optical films at the periphery, such as by application of an adhesive. When the films are stacked rather than laminated together, the air interface between the optical films may be only a few microns.

In some embodiments, a first microstructured optical film is proximate a second microstructured optical film. In such assemblies, the microstructured surface of the bottom film is preferably disposed proximate the unstructured surface of the top film. For embodiments that employ prismatic microstructured films, the prisms of the films are generally aligned parallel in one principal direction, the prisms being separated by grooves. It is generally preferred to align the prisms (or grooves) of the second (e.g. bottom) microstructured optical film in a stack such that the prisms are substantially orthogonal to the prisms of the first (e.g. top) film. However, other alignments can also be employed. For example, the prisms of the second optical film may be positioned relative to the prisms of the second optical film such that the intersection of grooves or prisms form angles ranging from about 70° to about 120°.

In one embodied assembly, a first microstructured substantially non-polarizing optical film is proximate a second microstructured substantially non-polarizing optical film. The gain of this assembly is at least 2.50. The first optical film may be the same as or different than the second optical film. For example, the second film may have a different base layer composition, a different microstructured surface composition, and/or may have a different surface microstructure. The relative gain of this assembly is typically less than 3.32. Accordingly, the relative gain of such assembly may also range from any values in the set of relative gain values including 2.55, 2.60, 2.65, 2.70, 2.75, 2.80, 2.85, 2.90, 2.95, and 3.00 or greater.

For the following defined terms, these definitions shall be applied, unless a different definition is given in the claims or elsewhere in this specification.

The term "microstructure" is used herein as defined and explained in U.S. Pat. No. 4,576,850. Thus, it means the configuration of a surface that depicts or characterizes the predetermined desired utilitarian purpose or function of the article having the microstructure. Discontinuities such as projections and indentations in the surface of said article will deviate in profile from the average center line drawn through the microstructure such that the sum of the areas embraced by the surface profile above the center line is equal to the sum of the areas below the line, said line being essentially parallel to the nominal surface (bearing the microstructure) of the article. The heights of said deviations will typically be about +/−0.005 to +/−750 microns, as measured by an optical or electron microscope, through a representative characteristic length of the surface, e.g., 1-30 cm. Said average center line can be plano, concave, convex, aspheric or combinations thereof. Articles where said deviations are of low order, e.g., from +/−0.005+/−0.1 or, preferably, +/−0.05 microns, and said deviations are of infrequent or minimal occurrence, i.e., the surface is free of any significant discontinuities, are those where the microstructure-bearing surface is an essentially "flat" or "smooth" surface, such articles being useful, for example, as precision optical elements or elements with a precision optical interface, such as ophthalmic lenses. Articles where said deviations are of low order and of frequent occurrence include those having anti-reflective microstructure. Articles where said deviations are of high-order, e.g., from +/−0.1 to +/−750 microns, and attributable to microstructure comprising a plurality of utilitarian discontinuities which are the same or different and spaced apart or contiguous in a random or ordered manner, are articles such as retroreflective cube-corner sheeting, linear Fresnel lenses, video discs and brightness enhancing films. The microstructure-bearing surface can contain utilitarian discontinuities of both said low and high orders. The microstructure-bearing surface may contain extraneous or non-utilitarian discontinuities so long as the amounts or types thereof do not significantly interfere with or adversely affect the predetermined desired utilities of said articles.

"Index of refraction," or "refractive index," refers to the absolute refractive index of a material (e.g., a monomer) that is understood to be the ratio of the speed of electromagnetic radiation in free space to the speed of the radiation in that material. The refractive index can be measured using known methods and is generally measured using an Abbe refractometer or Bausch and Lomb Refractometer (CAT No. 33.46.10) in the visible light region (available commercially, for example, from Fisher Instruments of Pittsburgh, Pa.). It is generally appreciated that the measured index of refraction can vary to some extent depending on the instrument.

"(Meth)acrylate" refers to both acrylate and methacrylate compounds.

The term "nanoparticles" is defined herein to mean particles (primary particles or associated primary particles) with a diameter less than about 100 nm.

"Surface modified colloidal nanoparticle" refers to nanoparticles each with a modified surface such that the nanoparticles provide a stable dispersion.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

Unless otherwise indicated, all numbers expressing quantities of ingredients, measurement of properties and so forth used in the specification and claims are to be understood as being modified in all instances by the term "about."

The present invention should not be considered limited to the particular examples described herein, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

EXAMPLES

Synthesis of trans-Stilbene-4-oxyacrylate (SA-1)

To a 500 ml round bottom equipped with an overhead stirrer and temperature probe was added trans-4-hydroxystilbene 23 g (0.117 moles, 1.0 equivalents), 4-hydroxy TEMPO 0.01 g, ethyl acetate 350 g, and acryloyl chloride 11.6 g (0.13 moles, 1.1 equivalents). The reaction was cooled to −6 C with isopropanol/ice bath and added 50% sodium hydroxide 11.25 g (0.14 moles, 1.2 equivalents) slowly keeping the temp below 0 C. The reaction was sampled after 30 min post addition. The GC indicated 0% starting material and 99% product. While continuing to cool at −5 C, added 100 g deionized water, 5 g acetic acid, mixed vigorously for 30 minutes. The aqueous was separated and the organic washed with 100 g saturated sodium carbonate water mixed for 30 minutes, separated and the organic was concentrated invacuo to recover an off white solid which was recrystallized from 100 ml ethyl acetate to recover 19 g (65%) white powder. Mp=125-127 Proton NMR indicated clean product. The material was found to have a surprisingly high refractive index of 1.657.

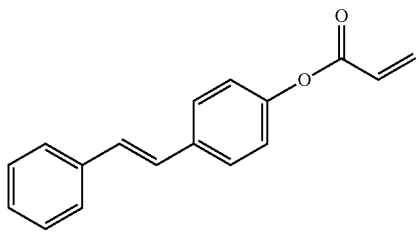

(SA-I)

Cinnamyl acrylate has the following structure:

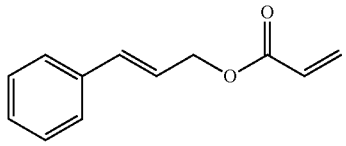

Polymerizable Resin Composition 1: 24 parts of cinnamyl acrylate (from Monomer-Polymer & Dajac Labs, Inc., Feasterville, Pa., having a refractive index of 1.552 and a viscosity of 6 cps at 25° C.), 76 parts CN120 (epoxy acrylate available from Sartomer Company, Exton, Pa., reported by Sartomer to have a viscosity of 2150 cps at 65° C., a refractive index of 1.5556 and a Tg of 60° C.), 2 parts Darocur 4265 (available from Ciba Specialty Chemicals, Tarrytown, N.Y.), and 1 part Irgacure 819 (available from Ciba Specialty Chemicals) were mixed together thoroughly in an amber jar.

Comparative Polymerizable Resin Composition A: 75 parts CN120, 25 parts SR339 (2-phenoxyethyl acrylate available from Sartomer Company, Exton, Pa., reported by Sartomer to have a viscosity of 12 cps at 25° C., a refractive index of 1.516 and a Tg of 5° C.), and 0.3 parts Darocur 4265 (available from Ciba Specialty Chemicals, Tarrytown, N.Y.) were mixed together thoroughly in an amber jar.

Polymerizable Resin Composition 2: 15 parts of SA-1 (with a refractive index of 1.657), 55 parts CN120, 30 parts SR339 (2-phenoxyethyl acrylate available from Sartomer Company, Exton, Pa., reported by Sartomer to have a viscosity of 12 cps at 25° C., a refractive index of 1.516 and a Tg of 5° C.), 2 parts Darocur 4265 (available from Ciba Specialty Chemicals, Tarrytown, N.Y.), and 1 part Irgacure 819 (available from Ciba Specialty Chemicals) were heated and mixed together thoroughly in an amber jar.

Comparative Polymerizable Resin Composition B: 65 parts CN120, 35 parts SR339 (2-phenoxyethyl acrylate available from Sartomer Company, Exton, Pa., reported by Sartomer to have a viscosity of 12 cps at 25° C., a refractive index of 1.516 and a Tg of 5° C.), 2 parts Darocur 4265 (available from Ciba Specialty Chemicals, Tarrytown, N.Y.), and 1 part Irgacure 819 (available from Ciba Specialty Chemicals) were mixed together thoroughly in an amber jar.

Optical Film Sample Preparation

About 3 grams of warm resin was applied to a 2 mil primed PET (polyester) film, available from DuPont under the trade designation "Melinex 623" and placed against a microstructured tool with a 90/24 pattern similar to the commercially available Vikuiti TBEF-90/24. The PET, resin and tool were passed through a heated laminator set at approximately 150° F. to create a uniformly thick sample. The tool containing the film and coated resin sample was passed at 50 fpm through a Fusion UV processor containing two 600 W/10 in D-bulbs to cure the film. The PET and cured resin were removed from the tool and cut into samples. The test methods used to evaluate the films are as follows:

Gain Test Method

Optical performance of the films was measured using a SpectraScan™ PR-650 SpectraColorimeter with an MS-75 lens, available from Photo Research, Inc, Chatsworth, Calif. The films were placed on top of a diffusely transmissive hollow light box. The diffuse transmission and reflection of the light box can be described as Lambertian. The light box was a six-sided hollow cube measuring approximately 12.5 cm×12.5 cm×11.5 cm (L×W×H) made from diffuse PTFE plates of ~6 mm thickness. One face of the box is chosen as the sample surface. The hollow light box had a diffuse reflectance of ~0.83 measured at the sample surface (e.g. ~83%, averaged over the 400-700 nm wavelength range, measurement method described below). During the gain test, the box is illuminated from within through a ~1 cm circular hole in the bottom of the box (opposite the sample surface, with the light directed towards the sample surface from the inside). This illumination is provided using a stabilized broadband incandescent light source attached to a fiber-optic bundle used to direct the light (Fostec DCR-11 with ~1 cm diameter fiber bundle extension from Schott-Fostec LLC, Marlborough Mass. and Auburn, N.Y.). A standard linear absorbing polarizer (such as Melles Griot 03 FPG 007) is placed between the sample box and the camera. The camera is focused on the sample surface of the light box at a distance of ~0.34 cm and the absorbing polarizer is placed ~2.5 cm from the camera lens. The luminance of the illuminated light box, measured with the polarizer in place and no sample films, was >150 cd/m². The sample luminance is measured with the PR-650 at normal incidence to the plane of the box sample surface when the sample films are placed parallel to the box sample surface, the sample films being in general contact with the box. The relative gain is calculated by comparing this sample luminance to the luminance measured in the same manner from the light box alone. The entire measurement was carried out in a black enclosure to eliminate stray light sources.

The diffuse reflectance of the light box was measured using a 15.25 cm (6 inch) diameter Spectralon-coated integrating sphere, a stabilized broadband halogen light source, and a power supply for the light source all supplied by Labsphere (Sutton, N.H.). The integrating sphere had three opening ports, one port for the input light (of 2.5 cm diameter), one at 90 degrees along a second axis as the detector port (of 2.5 cm diameter), and the third at 90 degrees along a third axis (i.e. orthogonal to the first two axes) as the sample port (of 5 cm diameter). A PR-650 Spectracolorimeter (same as above) was focused on the detector port at a distance of ~38 cm. The reflective efficiency of the integrating sphere was calculated using a calibrated reflectance standard from Labsphere having ~99% diffuse reflectance (SRT-99-050). The standard was calibrated by Labsphere and traceable to a NIST standard (SRS-99-020-REFL-51). The reflective efficiency of the integrating sphere was calculated as follows:

Sphere brightness ratio=1/(1−$R$sphere*$R$standard)

The sphere brightness ratio in this case is the ratio of the luminance measured at the detector port with the reference sample covering the sample port divided by the luminance measured at the detector port with no sample covering the sample port. Knowing this brightness ratio and the reflectance of the calibrated standard (Rstandard), the reflective efficiency of the integrating sphere, Rsphere, can be calculated. This value is then used again in a similar equation to measure a sample's reflectance, in this case the PTFE light box:

Sphere brightness ratio=1/(1−$R$sphere*$R$sample)

Here the sphere brightness ratio is measured as the ratio of the luminance at the detector with the sample at the sample port divided by the luminance measured without the sample. Since Rsphere is known from above, Rsample can be calculated. These reflectances were calculated at 4 nm wavelength intervals and reported as averages over the 400-700 nm wavelength range.

The single sheet gain is tested in the vertical (or perpendicular orientation relative to the front face of the diffuser boxed used in the E.T. Tester). In the horizontal, or crossed sheet configuration, the bottom sheet of the film stack is in the vertical orientation and the top sheet is horizontal or parallel to the front face of the diffuser box.

Table 3 as follows depicts the test results of the optical films.

TABLE 3

| Polymerizable Resin Composition | ET Gain Single Sheet | ET Gain crossed - Sheet |
|---|---|---|
| 1 | 1.62 | 2.56 |
| 2 | 1.63 | 2.56 |
| Comp-A | 1.60 | 2.51 |
| Comp-B | 1.60 | 2.51 |

What is claimed is:

1. An optical film wherein the film comprises a polymerized microstructured surface comprising the reaction product of a polymerizable resin composition comprising at least one (meth)acrylate monomer comprising a phenyl ethylene group, wherein the (meth)acrylate monomer has a refractive index of at least 1.54 and a structure is selected from:

A)

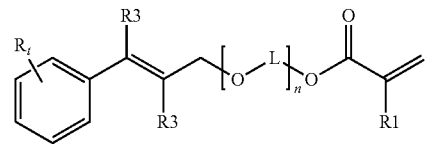

wherein

R is an optional substituent;

t ranges from 0 to 5;

R3 is H or a substituent;

L is a C2-C12 alkyl group optionally substituted with one or more hydroxyl groups;

n ranges from 0 to 10; and

R1 is H or CH$_3$;

or B)

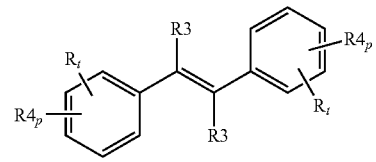

wherein

R4 is a substituent comprising a (meth)acrylate group, p independently ranges from 0 to 2 provided one p is at least 1;

R is an optional substituent;

t ranges from 0 to 5; and

R3 is H or a substituent.

2. The optical film according to claim 1 wherein the (meth)acrylate monomer has a refractive index of at least 1.60.

3. The optical film according to claim 1 wherein the (meth)acrylate monomer has a viscosity of less than 100 cps at 25° C.

4. The optical film of claim 1 wherein t is 0.

5. The optical film of claims 1 wherein R3 is H.

6. The optical film of claim 1 wherein the (meth)acrylate monomer has the structure A and R3 is independently selected from a C2-C12 alkyl group, halogen, alkyaryl, an ether group, and a nitro group.

7. The optical film of claim 1 wherein n is 0.

8. The optical film of claim 1 wherein the (meth)acrylate monomer has the structure B and R3 is independently selected from a C2-C12 alkyl, a halogen, and an ether group.

9. The optical film of claim 1 wherein the (meth)acrylate monomer has the structure B and R4 is selected from the group consisting of

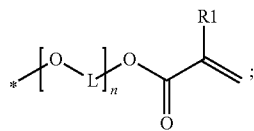

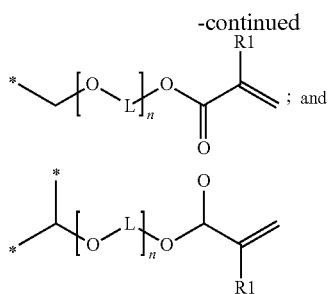
; and wherein
L is a C2-C12 alkyl group optionally substituted with one or more hydroxyl groups;
n ranges from 0 to 10; and
R1 is H or CH$_3$.

10. The optical film of claim 1 wherein the monomer is a mono(meth)acrylate monomer.

11. The optical film of claim 1 wherein the polymerizable resin composition comprises one or more aromatic monomers or oligomers having at least two aromatic groups and at least two (meth)acrylate groups.

12. The optical film of claim 11 wherein the polymerizable resin comprises 25 wt-% to 75 wt-% of the aromatic monomers or oligomers having at least two aromatic groups and at least two (meth)acrylate groups.

13. The optical film of claim 11 wherein the aromatic monomer or oligomer having at least two aromatic groups and at least two polymerizable (meth)acrylate groups has a molecular weight of at least 350 g/mole.

14. The optical film of claim 11 wherein the aromatic monomer or oligomer has the structure

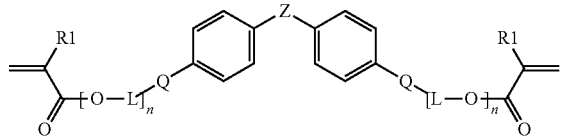

wherein
R1 is independently hydrogen or methyl;
Z is independently —C(CH$_3$)$_2$—, —CH$_2$—, —C(O)—, —S—, —S(O)—, or —S(O)$_2$—;
Q is independently O or S;
L is independently a C$_2$-C$_6$ alkyl group optionally substituted with one or more hydroxy groups; and
and n ranges from 0 to 10.

15. The optical film of claim 11 wherein the aromatic monomer or oligomer has the structure

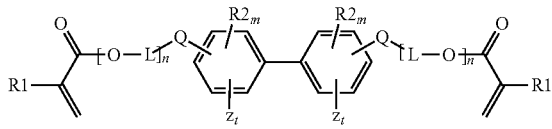

wherein
each R1 is independently H or methyl;
each R2 is independently Br;
m ranges from 0 to 4;
each Q is independently O or S;
n ranges from 0 to 10;
L is independently a C2 to C12 alkyl group optionally substituted with one or more hydroxyl groups;
z is an aromatic ring; and
t is independently 0 or 1.

16. The optical film of claim 1 wherein the polymerizable resin composition is non-halogenated.

17. The optical film of claim 1 wherein the optical film is a brightness enhancing film having a single sheet gain of at least 1.59.

18. The optical film of claim 1 wherein the polymerizable resin composition comprises inorganic nanoparticles.

* * * * *

UNITED STATES PATENT AND TRADEMARK OFFICE
CERTIFICATE OF CORRECTION

PATENT NO. : 8,080,608 B2
APPLICATION NO. : 12/936552
DATED : December 20, 2011
INVENTOR(S) : Hunt et al.

It is certified that error appears in the above-identified patent and that said Letters Patent is hereby corrected as shown below:

Column 11
Line 26, Delete "biphenol" and insert -- bisphenol --, therefor.
Line 55, Delete "novolak" and insert -- novolac --, therefor.
Line 57, Delete ""CN 112C60"." And insert -- "CN112C60". --, therefor.

Column 12
Line 22, Delete "binapthyl" and insert -- binaphthyl --, therefor.
Line 52, Delete "napthyl" and insert -- naphthyl --, therefor.

Column 13
Line 3, Delete "commerically" and insert -- commercially --, therefor.

Column 15
Line 30-31, Delete "trimethylbenzoybiphenylphosphine" and insert
-- trimethylbenzoylbiphenylphosphine --, therefor.

Column 24
Line 47, In Claim 5, delete "claims" and insert -- claim --, therefor.

Signed and Sealed this
Twenty-eighth Day of February, 2012

David J. Kappos
*Director of the United States Patent and Trademark Office*